(12) United States Patent
Bullock

(10) Patent No.: US 11,618,370 B2
(45) Date of Patent: Apr. 4, 2023

(54) CARGO RESTRAINT PANEL WITH COMPRESSIBLE SIDE COVER

(71) Applicant: Matthew Bullock, McLean, VA (US)

(72) Inventor: Matthew Bullock, McLean, VA (US)

(*) Notice: Subject to any disclaimer, the term of this patent is extended or adjusted under 35 U.S.C. 154(b) by 164 days.

(21) Appl. No.: 17/038,979

(22) Filed: Sep. 30, 2020

(65) Prior Publication Data

US 2022/0097596 A1 Mar. 31, 2022

(51) Int. Cl.
  *B60P 7/18* (2006.01)
  *B61D 45/00* (2006.01)
  *B60P 7/14* (2006.01)

(52) U.S. Cl.
  CPC ...... *B60P 7/18* (2013.01); *B60P 7/14* (2013.01); *B61D 45/008* (2013.01)

(58) Field of Classification Search
  CPC ............ B60P 7/18; B60P 7/0892; B60P 7/10; B60P 7/135; B60P 7/14; B60P 7/16; B61D 45/008
  USPC ..... 410/87, 88, 95, 121, 118, 117, 129, 140, 410/154, 155
  See application file for complete search history.

(56) References Cited

U.S. PATENT DOCUMENTS

| | | |
|---|---|---|
| 2,674,206 A | 4/1954 | Scott |
| 3,059,593 A | 10/1962 | Mack |
| 3,072,270 A | 1/1963 | Tolby et al. |
| 3,199,689 A | 8/1965 | Feldkamp |
| 3,314,379 A | 4/1967 | Krokos |
| 3,336,069 A | 8/1967 | Bayer et al. |
| 3,413,932 A | 12/1968 | Bennett |
| 3,421,451 A | 1/1969 | Brucks |
| 3,424,108 A | 1/1969 | Vargen |
| 3,462,027 A | 8/1969 | Puckhaber |
| 3,581,674 A | 6/1971 | O'Leary |
| 3,767,066 A | 10/1973 | Martin et al. |
| 3,767,253 A | 10/1973 | Kluetsch |
| 3,872,799 A | 3/1975 | Dousset |
| 3,985,242 A | 10/1976 | Schlaeger |
| 4,247,237 A | 1/1981 | Brown |
| 4,264,251 A | 4/1981 | Blatt |
| 4,300,864 A | 11/1981 | Liebel et al. |
| 4,396,325 A | 8/1983 | Joice-Cavanagh |
| 4,566,831 A | 1/1986 | Groth |
| 4,780,034 A * | 10/1988 | Skotte ................. B60P 7/16 410/129 |
| 4,854,792 A | 8/1989 | Cottone |
| 4,880,342 A * | 11/1989 | Pradovic ............... B60P 7/14 410/121 |
| 4,886,404 A | 12/1989 | Jensen et al. |
| 5,010,943 A | 4/1991 | Boyer |
| 5,132,156 A | 7/1992 | Trassare, Jr. et al. |

(Continued)

FOREIGN PATENT DOCUMENTS

DE 3422041 A1 12/1985

OTHER PUBLICATIONS

Materials downloaded Sep. 29, 2020 from shockguard.net.

*Primary Examiner* — Stephen T Gordon
(74) *Attorney, Agent, or Firm* — Banner & Witcoff, Ltd.

(57) ABSTRACT

A cargo restraint panel may comprise a foam core and one or more side caps covering one or more sides of the foam core. A side cap may protect a side of the foam core covered by the side cap. A side cap may comprise a ridge that allows the side cap to compress.

20 Claims, 13 Drawing Sheets

(56) References Cited

U.S. PATENT DOCUMENTS

| | | | |
|---|---|---|---|
| 5,269,639 A * | 12/1993 | Ryder, Jr. | B60P 7/135 410/155 |
| 5,678,968 A | 10/1997 | Bourgeois et al. | |
| 5,709,512 A | 1/1998 | Smith | |
| 5,741,098 A | 4/1998 | Letts, III | |
| 5,855,459 A | 1/1999 | Krier et al. | |
| 6,017,175 A | 1/2000 | Kassab et al. | |
| 6,089,802 A | 7/2000 | Bullock | |
| 6,227,779 B1 | 5/2001 | Bullock | |
| 6,527,488 B2 | 3/2003 | Elze et al. | |
| 6,607,337 B1 | 8/2003 | Bullock | |
| 6,896,459 B1 | 5/2005 | Bullock | |
| 6,923,609 B2 | 8/2005 | Bullock | |
| 6,981,827 B2 | 1/2006 | Bullock | |
| 7,018,151 B2 | 3/2006 | Bullock | |
| 7,066,698 B2 | 6/2006 | Bullock | |
| 7,137,765 B1 | 11/2006 | Elze et al. | |
| 7,290,969 B2 | 11/2007 | Bullock | |
| 7,322,781 B2 | 1/2008 | Bullock | |
| 7,329,074 B2 | 2/2008 | Bullock | |
| 7,458,755 B2 | 12/2008 | Ramirez et al. | |
| 7,604,443 B2 | 10/2009 | Bullock | |
| 7,708,508 B2 | 5/2010 | Bullock | |
| 7,726,920 B2 | 6/2010 | Bullock | |
| 7,789,604 B2 | 9/2010 | Rotche | |
| 7,798,754 B2 | 9/2010 | Funk et al. | |
| 8,113,752 B2 | 2/2012 | Bullock | |
| 8,128,324 B2 | 3/2012 | Bullock | |
| 8,128,327 B2 | 3/2012 | Jevaney | |
| 8,308,411 B2 | 11/2012 | Funk et al. | |
| 8,398,343 B1 | 3/2013 | Henley et al. | |
| 8,398,344 B2 | 3/2013 | Bullock | |
| 8,403,607 B1 | 3/2013 | Bullock | |
| 8,403,608 B1 | 3/2013 | Bullock | |
| 8,403,609 B1 | 3/2013 | Bullock | |
| 8,408,852 B1 | 4/2013 | Bullock | |
| 8,419,329 B1 | 4/2013 | Bullock | |
| 8,727,682 B2 | 5/2014 | Johnson et al. | |
| 8,888,424 B1 | 11/2014 | Bullock | |
| 8,979,449 B2 | 3/2015 | Bullock | |
| 9,090,194 B1 | 7/2015 | Bullock | |
| 9,333,899 B1 | 5/2016 | Bullock | |
| 9,637,044 B2 | 5/2017 | Bullock | |
| 10,112,525 B1 | 10/2018 | Bullock | |
| 10,132,911 B1 | 11/2018 | Bullock | |
| 10,427,583 B2 | 10/2019 | Bullock | |
| 10,654,399 B2 | 5/2020 | Bullock | |
| 11,220,205 B2 | 1/2022 | Bullock | |
| 2003/0206782 A1 | 11/2003 | Toglia | |
| 2008/0047210 A1 | 2/2008 | Bell | |
| 2010/0092264 A1 * | 4/2010 | Jevaney | B61D 45/006 410/129 |
| 2011/0033258 A1 | 2/2011 | Unander | |
| 2012/0099941 A1 | 4/2012 | Larsh et al. | |
| 2014/0105703 A1 | 4/2014 | Kvilhaug et al. | |
| 2014/0271022 A1 | 9/2014 | Ridgeway | |
| 2019/0359114 A1 | 11/2019 | Bullock | |

* cited by examiner

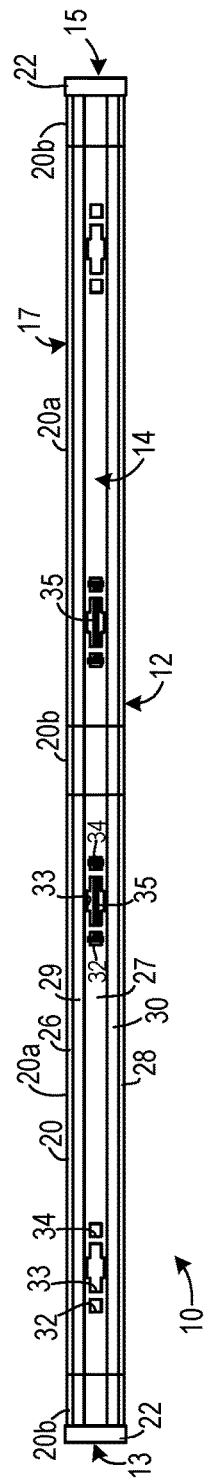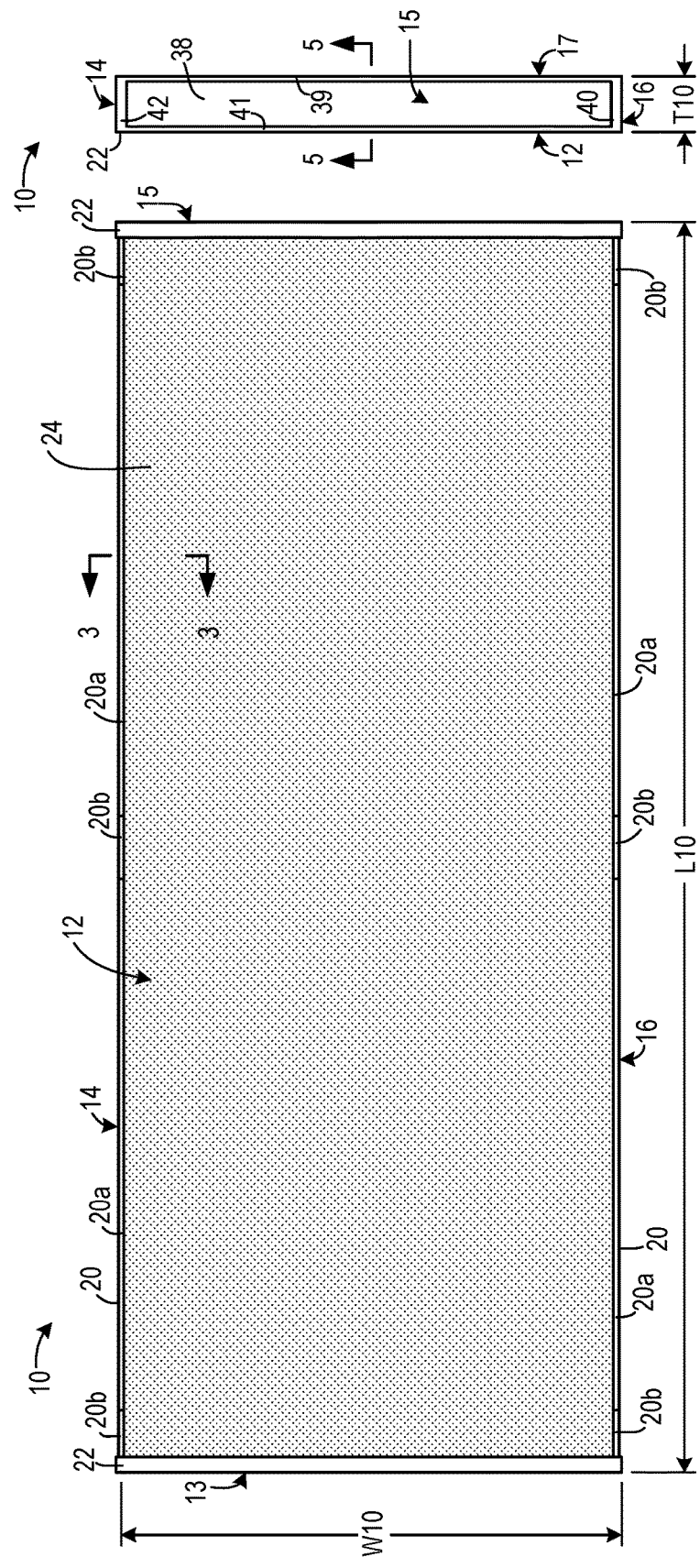

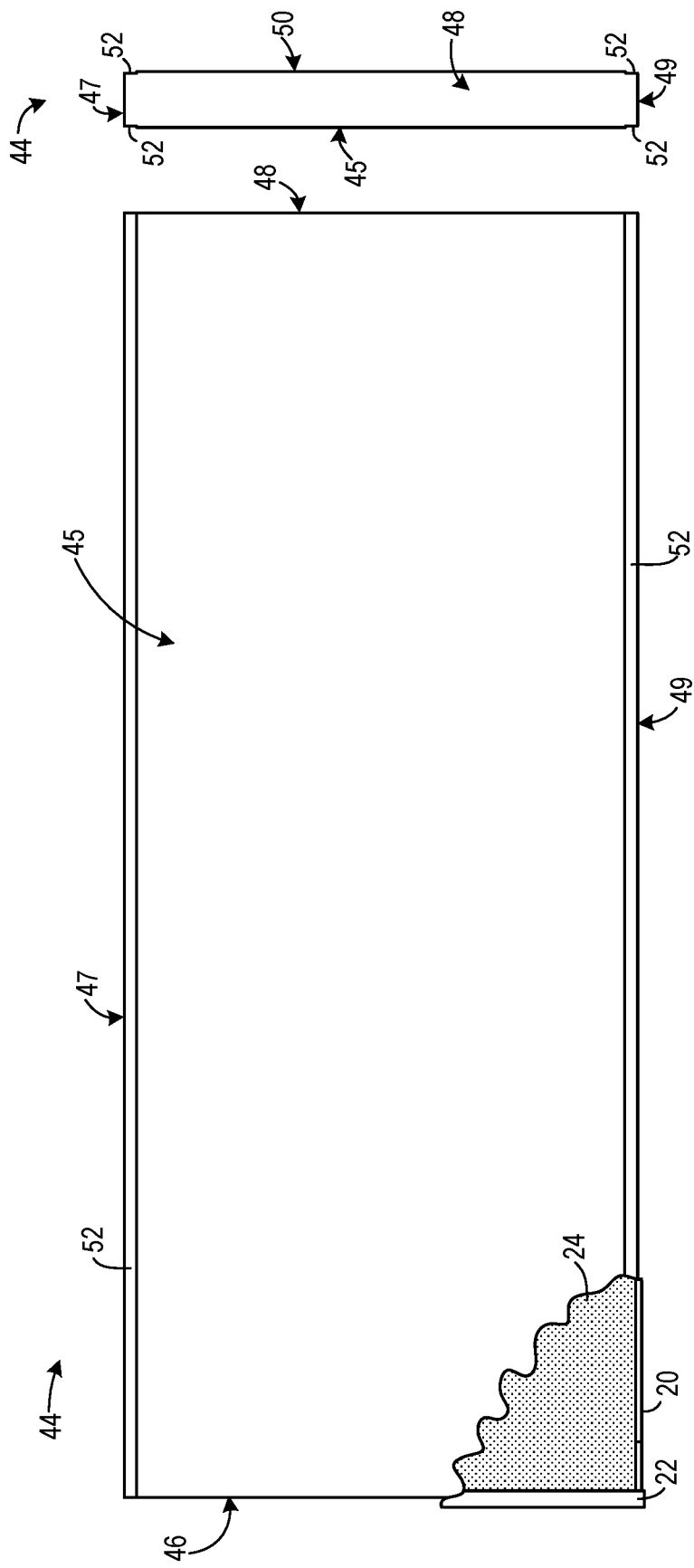

CARGO RESTRAINT PANEL WITH COMPRESSIBLE SIDE COVER

BACKGROUND

Cargo transported by rail may take the form of cargo units such as boxes, crates, drums, reinforced bags, plastic wrapped bundles, cased goods, metal coils, specialty heavy paper rolls, plastic or metal containers mounted on pallets, other types of palletized cargo, etc. To prevent damage caused by forward and/or reverse acceleration of railcars, cargo units may be restrained from forward or rearward movement. Polymer foam panels may be used to provide such restraint. In addition to providing restraint, such panels offer advantages over various types of dunnage materials.

One such advantage is re-usability. However, re-usability may be diminished if a cargo restraint panel is not protected from damage. Sides of a cargo restraint panel may be prone to damage because they are often exposed when the panel is in use or in storage, because the sides are often gripped during placement or other handling, and/or for other reasons. Although cargo restraint panel sides can be strengthened and/or otherwise modified, doing so may detract from performance of the panel.

SUMMARY

This Summary is provided to introduce a selection of some concepts in a simplified form as a prelude to the Detailed Description. This Summary is not intended to identify key or essential features.

A cargo restraint panel may comprise a foam core and one or more side caps covering one or more sides of the foam core. A side cap may comprise a ridge that allows the side cap to compress. A side cap may comprise one or more additional ridges. The additional ridges and the compression ridge may be configured so that the additional ridges are positioned to support the cargo restraint panel when the cargo restraint panel rests on the side cap. Side caps may comprise multiple sections and/or handles.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

FIG. 2A is a front view of an example cargo restraint panel.

FIGS. 2B and 2C are side views of the cargo restraint panel of FIG. 2A.

FIGS. 2D and 2E are respective front and side views of a polymer foam core of the cargo restraint panel of FIG. 2A

DETAILED DESCRIPTION

Figure 1A:
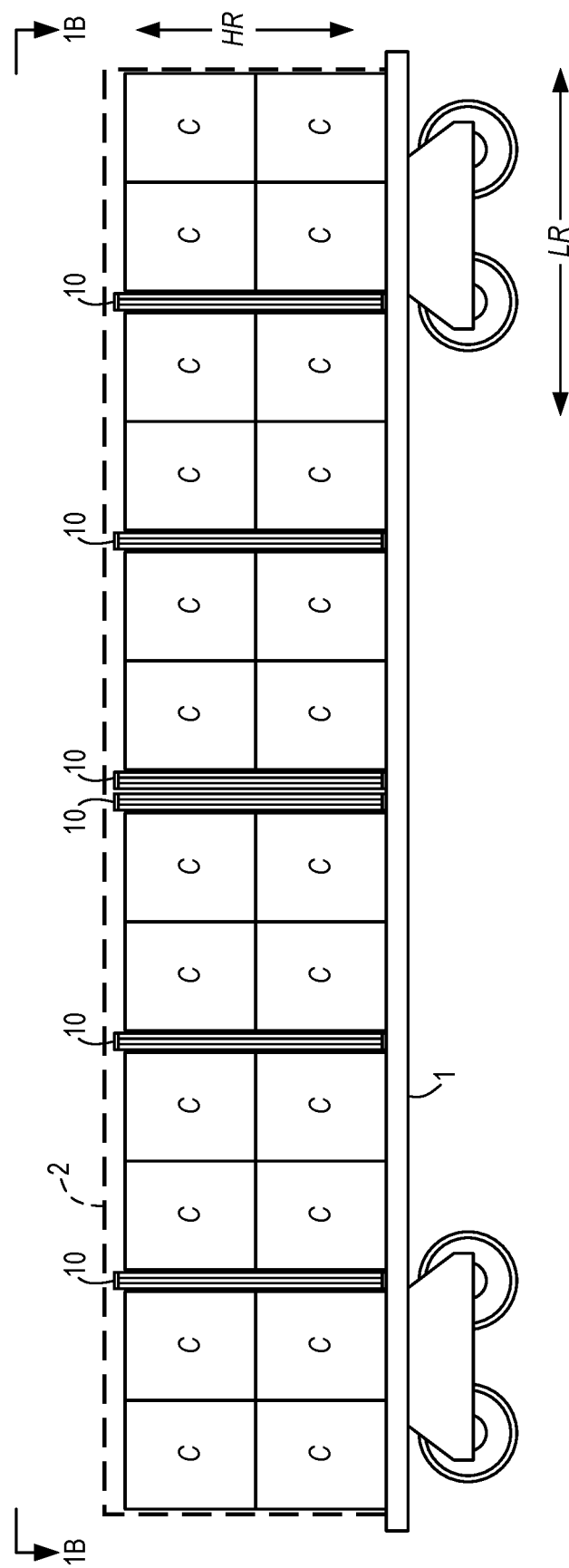
FIGS. 1A and 1B show an example of cargo unit restraint in a railcar.
Figure 1B:
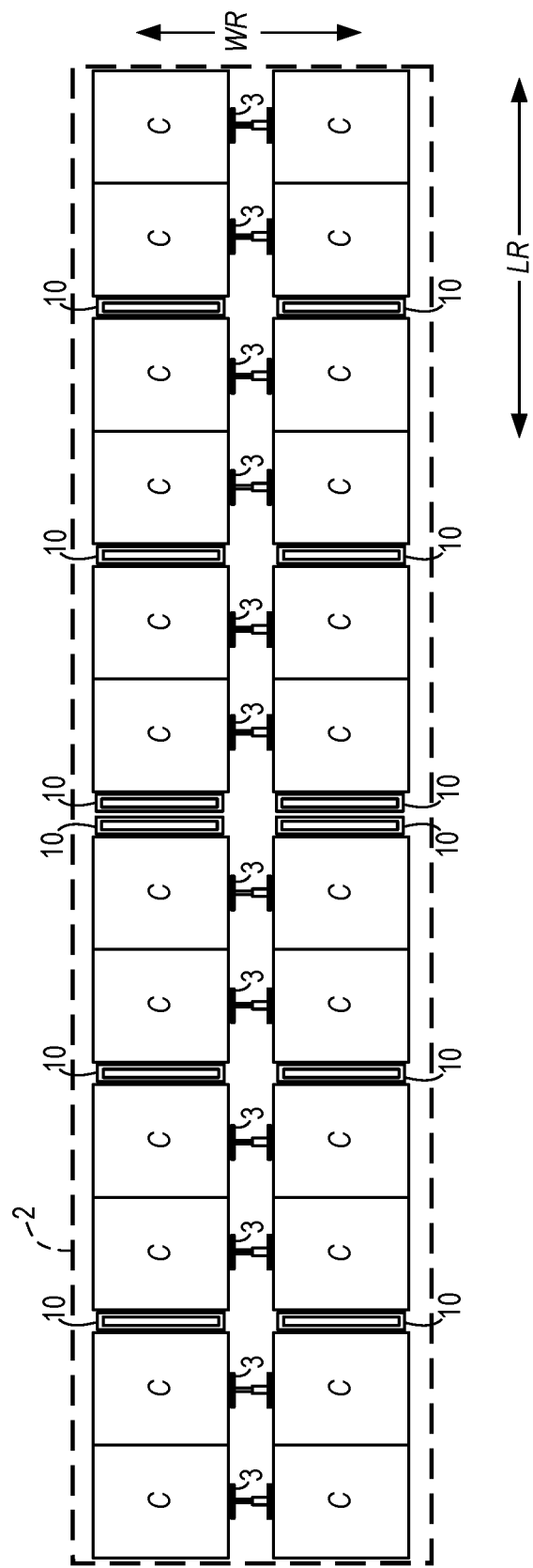

FIG. 1A is a partially schematic side view of a loaded railcar 1 showing an example of restraint of cargo units C using cargo restraint panels 10. The panels 10 are described in detail in connection with subsequent drawing figures. FIG. 1B is a partially schematic top view of the loaded rail car 1. In FIGS. 1A and 1B, the top, the side walls, and the end walls of the railcar 1 have been omitted for purposes of explanation. An outline 2 of the inner surfaces of the railcar 1 ceiling, side walls, and end walls is shown with broken lines. For convenience, a length axis LR, a width axis WR, and a height axis HR are also indicated. Subsequent references to length, width, or height within a railcar refer to dimensions along the axes LR, WR, and HR, respectively.

Situated within the railcar 1 are a plurality of cargo units C. For convenience, the cargo units C in the example of FIGS. 1A and 1B are uniformly sized. Along the axis WR, the cargo units C are separated by void filling elements 3. The elements 3 may, for example, comprise expandable void fillers such as those sold under the name Void Gard® by Walnut Industries, Inc. of Bensalem, Pa., US, and/or as described in one or more of U.S. Pat. Nos. 7,604,443, 7,708,508, or U.S. Pat. No. 7,726,920, all of which are incorporated by reference herein. Other types of void fillers can also or alternatively be used to fill voids between the cargo units C in the direction of axis WR and/or between the cargo units C and a side wall of the railcar 1. In the direction of axis LR, the cargo restraint panels 10 are interposed between some of the cargo units C.

As seen in FIGS. 1A and 1B, the cargo units C are restrained from movement in the direction of the axis LR by the presence of the panels 10 and by the presence of other cargo units. In particular, each of the cargo units C is restrained from movement along axis LR by elimination of gaps between the front and rear of that cargo unit C and the next object (e.g., another cargo unit C, a panel 10, an end wall of railcar 1) along axis LR.

The arrangement of the cargo units C and the cargo restraint panels 10 shown in FIGS. 1A and 1B is merely one example of cargo restraint using cargo restraint panels such as are described herein. Cargo units of different sizes and/of non-uniform sizes may be restrained using cargo restraint panels such as are described herein, and such cargo units may be arranged in another manner. The quantity and/or arrangement of cargo restraint panels may be varied from what is shown in FIGS. 1A and 1B. For example, more or fewer cargo units may be positioned directly adjacent along the LR axis (e.g., without an intervening cargo restraint panel), and/or cargo units may be stacked in more than two layers and/or not stacked. Cargo restraint panels of other sizes may also or alternatively be used.

FIG. 2A is a front view of an example cargo restraint panel 10 comprising a panel front 12 and four panel sides 13, 14, 15, and 16. FIG. 2B is a side view of the panel 10 facing the panel side 14, and further shows a panel rear 17 of the cargo restraint panel 10. The structure of the panel side 14 may be the same as or similar to the structure of the panel side 16, and the structure of the panel rear 17 may be the same as or similar to the structure of the panel front 12. FIG. 2C is a side view of the cargo restraint panel 10 facing the panel side 15. The structure of the panel side 13 may be the same as or similar to the structure of the panel side 15. The panel 10 may have a length L10 (e.g., 108 inches), a width W10 (e.g., 36 inches), and a thickness T10 (e.g., 4 inches). These dimensions are only examples, however. As additional examples, L10 may range from 48 inches to 108 inches, W10 may range from 24 inches to 60 inches, and/or T10 may range from 1 inch to 12 inches, and a cargo restraint panel may have dimensions that comprise any combination of a value for L10 selected from the aforementioned range of L10 values, a value for W10 selected from the aforementioned range of W10 values, and a value for T10 selected from the aforementioned range of T10 values. As further examples, a cargo restraint panel may have dimensions that comprise values for L10, W10, and/or T10 that are outside of the aforementioned ranges.

The panel sides 13-16 may comprise side caps. Each of the panel sides 14 and 16 may comprise a first type of side cap 20. Each of the panel sides 13 and 15 may comprise a second type of side cap 22. As explained in more detail below, the cargo restraint panel 10 may comprise a polymer foam core. The side caps 20 may cover a first pair of opposing sides of the core (e.g., the panel sides 14 and 16), and the side caps 22 may cover a second pair of opposing sides of the core (e.g., the panel sides 13 and 15). A barrier comprising a flexible facing material 24 (indicated with stippling) may be bonded to a front of the core and to portions of each of the side caps 20 on the panel front 12. Another barrier comprising the facing material 24 may be bonded to a rear of the core and to portions of each of the side caps 20 on the panel rear 17. The side caps 22 may also cover ends of the side caps 20 and ends of the sheets of facing material 24. Each of the side caps 22 may comprise a single valley 38 surrounded by ridges 39-42 on all sides.

Each of the side caps 20 may comprise a rear ridge 26, a compression ridge 27, and a front ridge 28. A rear valley 29 may separate the rear ridge 26 and the compression ridge 27. A front valley 30 may separate the compression ridge 27 and the front ridge 28. The rear ridge 26, the compression ridge 27, the front ridge 28, the rear valley 29, and the front valley 30 may extend over all or substantially all (e.g., at least 90%) of the length L10 of the of the panel side 14. Sets of openings 32, 33, and 34 may be formed in the compression ridge 27. A flexible handle 35 may be inserted into some, all, or none of the sets of handle openings 32, 33, and 34. Each of the handles 35 may comprise an end with tabs that can be folded and/or otherwise deformed so as to allow insertion of one end through an opening 33 and out an adjacent opening 32 and of another end through that opening 33 and out an adjacent opening 34, with the enlarged ends then unfolding to retain the handles in place. Optionally, handle openings may be omitted and/or handle may be attached in a different manner.

The side caps 20 may comprise multiple sections. For example, a side cap 20 may comprise main sections 20a joined by connecting sections 20b. Connecting sections 20b may also be placed at the ends of the side cap 20 to connect main sections 20a to end sections described below. Forming a side cap 20 from main sections 20a and connecting sections 20b may allow use of the sections 20a and/or 20b to form side caps of different lengths (e.g., for different sizes of cargo restraint panels) and/or may be more convenient to produce and/or store than a longer side cap section.

FIG. 2D is a front view of a polymer foam core 44 of the cargo restraint panel 10. A portion of the side cap 20, the side cap 22, and the facing material 24 corresponding to a corner of the cargo restraint panel 10 are included in FIG. 2D to partially indicate locations of those components relative to the core 44. The core 44 may be a single piece of polymer foam or may comprise multiple layers and/or sections. The core 44 may comprise a core front 45 that corresponds to the panel front 12, a core side 46 that corresponds to the panel side 13, a core side 47 that corresponds to the panel side 14, a core side 48 that corresponds to the panel side 15, and a core side 49 that corresponds to the panel side 16. FIG. 2E is a side view of the core 44 facing the core side 48. The core 44 may further comprise a core rear 50 that corresponds to the panel rear 17. Rabbets (e.g., two-sided open-ended recesses) 52 may be formed at edges of the core front 45 adjacent the core sides 47 and 49. Similar rabbets 52 may be formed at edges of the core rear 50 adjacent the core sides 47 and 49.

The core 44 may comprise a resilient, compressible material. The core 44 may, for example, comprise a sheet of extruded polystyrene (XPS) foam having a nominal density of 2.0 pounds per cubic foot (PCF) and a minimum ASTM D1621 compressive strength of 60 pounds per square inch (psi). Expanded polystyrene (EPS) having similar properties may be used. Other grades of EPS, XPS, and/or other polymer foams may be used. Examples of EPS that may be used comprise ASTM C 578 Type XI (0.70-0.89 PCF), Type I (0.9-1.14 PCF), Type VIII (1.15-1.34 PCF), Type II (1.35-1.79 PCF), and/or Type IX (1.80-2.20 PCF), and/or EPS Geofoam (e.g., ASTM D6817 EPS12 Type XI, EPS15 Type 1, EPS19 Type VIII, EPS 22 Type II, EPS29 Type IX, EPS 39 Type XIV, and/or EPS46). Examples of XPS that may be used comprise ASTM C 578-95 Type X, Type IV, Type VI, Type VII, and/or Type V. Also or alternatively, the core 44 may comprise a sheet of polyurethane foam, polyethylene foam, melamine foam, and/or another foam, any of which may have a density and/or other properties similar to those of one or more of the aforementioned EPS and/or XPS foams. Also or alternatively, the core 44 may comprise a sheet of a non-polymer foam or of a foam-like material that mimics the properties of a polymer foam (e.g., that mimics one or more properties of a polymer foam such as one or more of the aforementioned EPS and/or XPS foams). Examples of such foam-like materials comprise natural or artificial sponge. Also or alternatively, the core 44 may comprise a sheet of natural or artificial cork.

Figure 3:
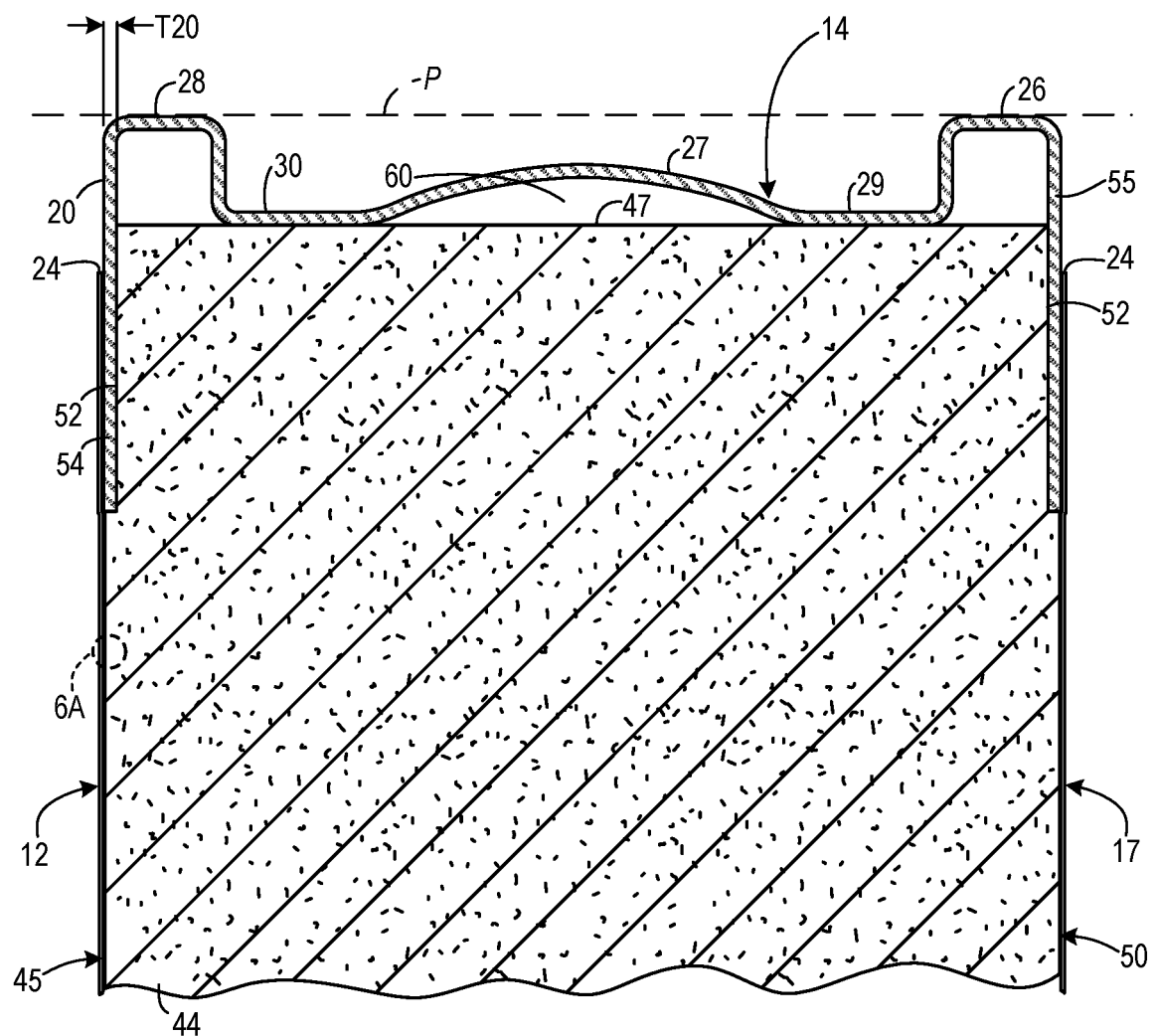
FIG. 3 is an area cross-sectional view from the location indicated in FIG. 2A.

FIG. 3 is an area cross-sectional view, taken from the location indicated in FIG. 2A, showing additional details of the side cap 20 on the panel side 14. As indicated above, the structure of the side cap 20 on the panel side 16 may be the same as or similar to that of the side cap 20 on the panel side 14. Although the below description of will refer generally to the side cap 20, the description may apply to the main sections 20a, and/or to portions of the side cap 20 formed by a joint between a main section 20a and a connecting section 20b and/or by a joint between a main section 20a and an end section. The side cap 20 may be extruded, molded, or otherwise formed from one or more plastics. An example material from which the side caps 20 may be formed is a polyolefin such as a high density polyethylene (HDPE), a medium density polyethylene (MDPE), and/or a low density polyethylene (LDPE). Also or alternatively, the side caps 20 may be formed other materials that comprise polycarbonate (PC), acrylonitrile butadiene styrene (ABS), polyvinyl chloride (PVC), polypropylene, and/or other polymers. An example thickness T20 of the side caps 20 may be 0.125 inches (125 mils).

The side cap 20 comprises a front flange 54 and a rear flange 55. A first portion of the front flange 54 rests in the rabbet 52 formed in the edge of the core front 45 that is adjacent to the core side 47. A second portion of the flange 54 forms a front of the front ridge 28. A first portion of the rear flange 55 rests in the rabbet 52 formed in the edge of the core rear 50 that is adjacent to the core side 47. A second portion of the flange 55 forms a rear of the rear ridge 26. The rear of the front ridge 28 extends from the top of the front ridge 28 to the front valley 30, and the front of the rear ridge 26 extends from the top of the rear ridge 26 to the rear valley 29. The valleys 29 and 30 extend toward and join the compression ridge 27. In the example of FIG. 3, the compression ridge 27 has an open-sided dome shape.

Figure 4:
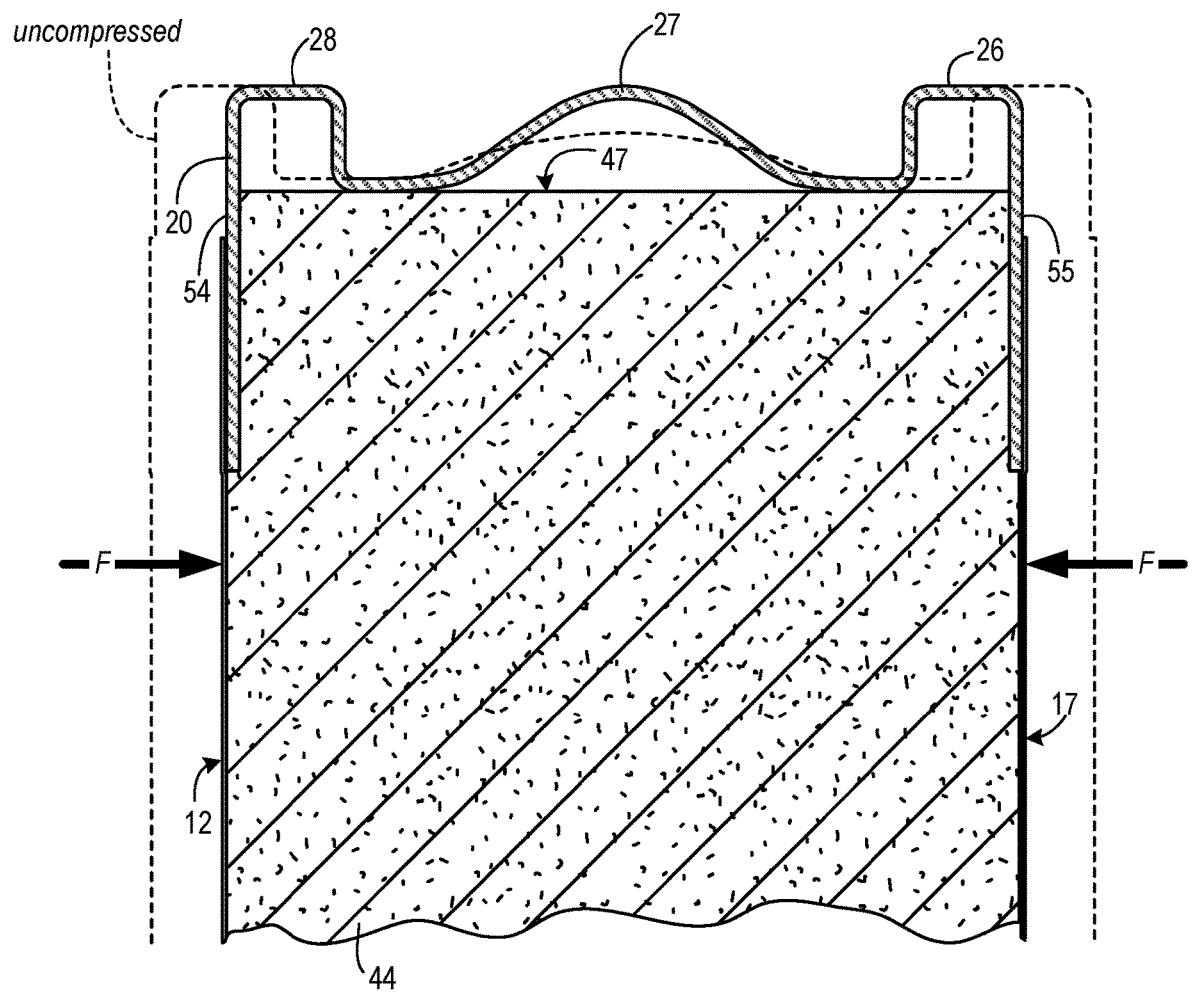
FIG. 4 is an area cross-sectional view, similar to that of FIG. 3, showing compression of a portion of the cargo restraint panel of FIG. 2A.

The compression ridge 27 allows the side cap 20 to accommodate compression of the core 44. FIG. 4 is an area cross-sectional view, similar to that of FIG. 3 and corresponding to the same portion of the cargo restraint panel 10, showing compression of that portion of the cargo restraint panel 10. As shown in FIG. 4, forces F on panel front 12 and panel rear 17 may compress the core 44. This may cause the thickness of the cargo restraint panel 10 to be reduced relative the uncompressed condition, an outline of which is shown in FIG. 4 using broken lines. The compression ridge 27 is able to deform away from the core side 47. This allows the side cap 20 to compress to follow the core front 45 and core rear 50 as they move toward one another. If the side cap 20 were not able to compress such as is shown in FIG. 4, the side cap 20 may separate from the core 44 and potentially cause damage to the panel 10. If the side cap were not able to compress, it may also interfere with the ability of the panel 10 to absorb shock loads.

Returning to FIG. 3, the underside portions of the side cap 20 corresponding to the front valley 30 and the rear valley 29 may contact the face of the core side 47. However, there may be an air gap 60 between the face of the core side 47 and the underside portion of the side cap 20 corresponding to the compression ridge 27. The may also be an air gap between the face of the core side 47 and the underside portion of the side cap 20 corresponding to the front ridge 28 and between the face of the core side 47 and the underside portion of the side cap 20 corresponding to the rear ridge 26. The air gap 60 may allow the compression ridge to more easily flex away from the core side 47 (e.g., as is shown in FIG. 4). The underside portions of the side cap 20 corresponding to the valleys 29 and 30 may be unbonded to the core side 47, thereby allowing those underside portions to slide across and/or move away from the core side 47 during compression such as is shown in FIG. 4.

As also shown in FIG. 3, the outer surfaces of the portions of the side cap 20 corresponding to the front ridge 28 and the rear ridge 26 extend further outward than the outer surface of the portion of the side cap 20 corresponding to the compression ridge 27. This provides a configuration of the front ridge 28, the compression ridge 27, and the rear ridge 26 that allows the side cap 20, upon placement into contact with a planar surface P, to stably rest upon the front ridge 28 and the rear ridge 26. This would facilitate, for example, storing the panel 10 by placing the panel side 14 on a floor surface.

Figure 5:
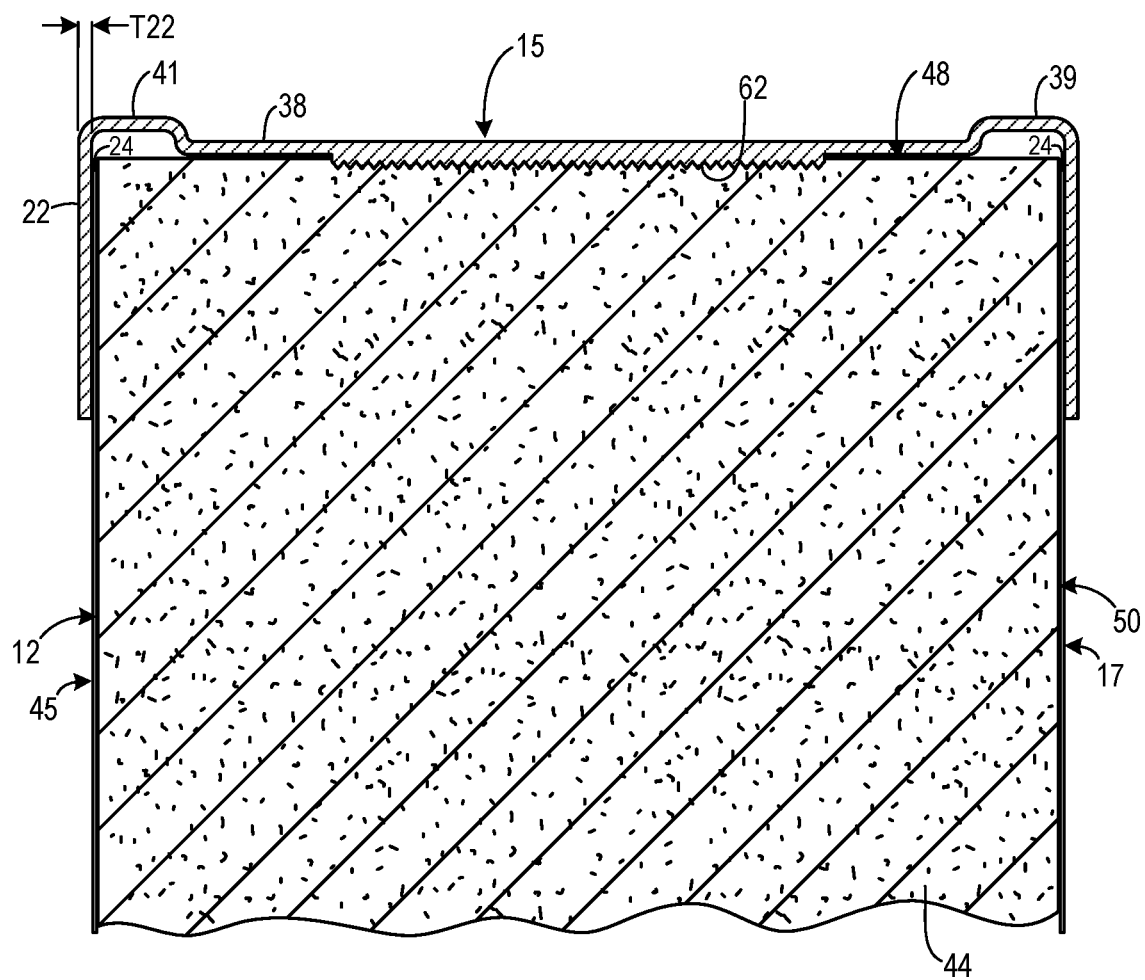
FIG. 5 is an area cross-sectional view from the location indicated in FIG. 2C.

FIG. 5 is an area cross-sectional view, taken from the location indicated in FIG. 2C, showing additional details of the side cap 22 on the panel side 15. As indicated above, the structure of the side cap 22 on the panel side 13 may be the same as or similar to that of the side cap 22 on the panel side 15. The side cap 22 may be molded or otherwise formed from one or more plastics. The side caps 22 may be formed from HDPE and/or any of the other materials that may be used to form the side caps 20. An example thickness T22 of the side caps 20 may be 0.125 inches (125 mils).

The side cap 22 may comprise a gripping panel 62 formed on an inner surface of the portion of the side cap 22 forming the valley 38. The gripping panel 62 may extend over most or all of the interior length of the side cap 22 (e.g., in a direction perpendicular to the plane of FIG. 5). The gripping panel 62 may comprise a plurality of pointed projections that protrude into the core side 48.

The side cap 22 may lack a compression ridge similar to the compression ridge 27, and may be less compressible than the side cap 20 along an axis between the panel front 12 and the panel rear 17. However, such compressibility may be less important at the panel end 13 and the panel end 15 than in portions of the cargo restraint panel 10 between the panel ends 13 and 15. For example, in some configurations one of those panel ends may be located above cargo units being restrained with the cargo restraint panel 10. FIG. 1A shows an example of such a configuration. With regard the panel ends located at or near a floor of a railcar, a cargo unit may be less prone to damage-causing movement or shifting at or near the floor, as portions of the cargo unit near the floor may be displaced from the center of mass of the cargo unit. Optionally, however, the side cap 20 may be modified to comprise a compression ridge similar to the compression ridge 27 and/or to omit the gripping panel 62.

The facing material 24 may be added to the panel 10 to protect the core 44 from gouging, perforation, and/or other types of damage that might shorten a service life of the panel 10. The facing material 24 may cover all or substantially of the surfaces of the core front 45 and of the core rear 50 that are not covered by portions of the side caps 20.

Figure 6A:
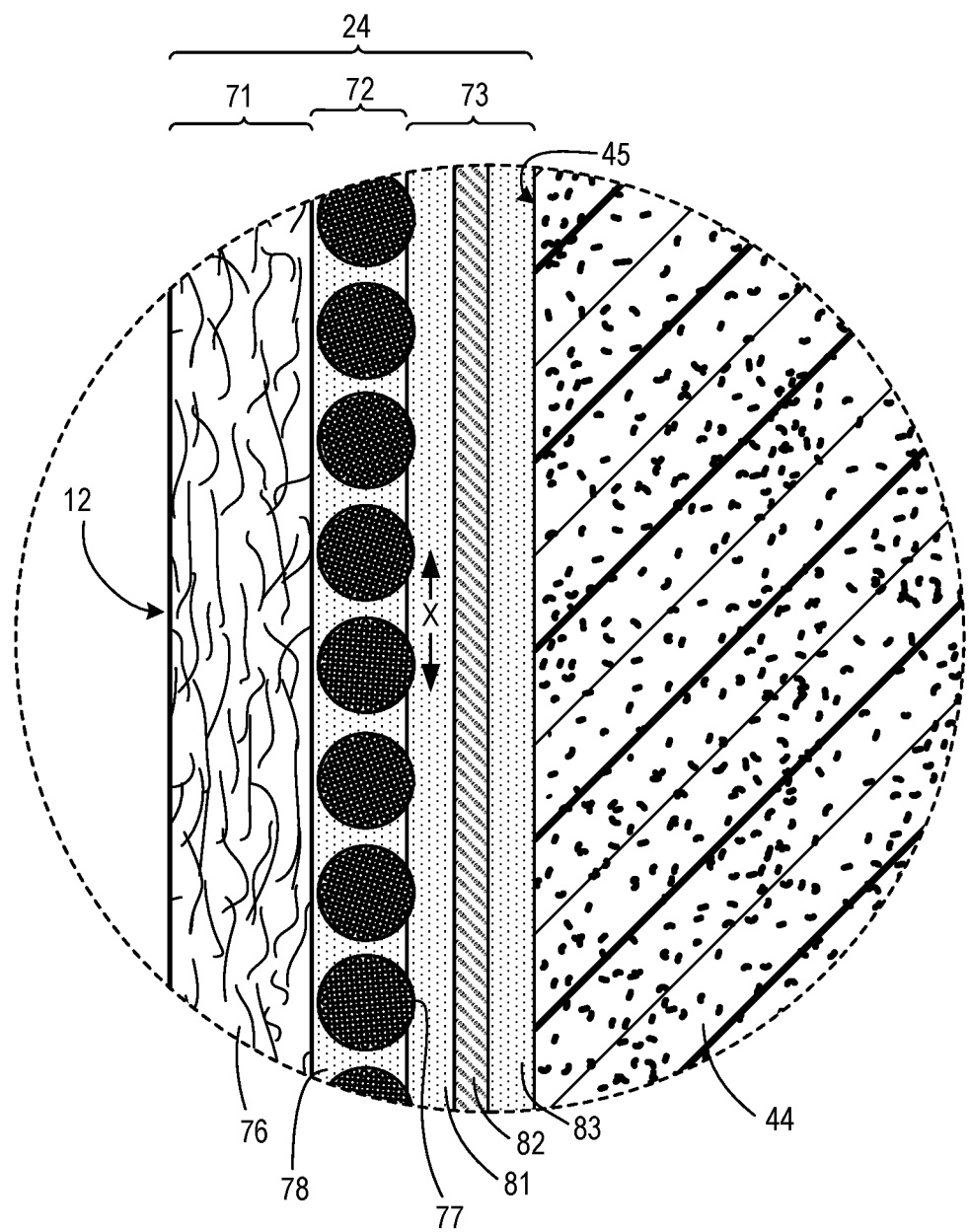
FIG. 6A is an enlarged area cross-sectional view from the location indicated in FIG. 3.

FIG. 6A is an enlarged area cross-sectional view, from the location indicated in FIG. 3, showing additional details of an example structure of the facing material 24. As seen in FIG. 6A, facing material 24 may comprise an outer layer 71, a reinforcement layer 72, and an attachment layer 73. The outer layer 71 may comprise a sheet 76 of an outer layer material. Sheet 76 may, for example, comprise a continuous piece of spun bonded polyethylene fiber material. Examples of such material comprise the product sold under the trade name TYVEK. Also or alternatively, one or more other materials may be used in outer layer 71. Examples of other outer layer materials comprise bands of other types of spun bonded polymer fibers, films of polyester, polyethylene terephthalate (e.g., such as films sold under the trade name MYLAR) or other polymers, paper, bands of woven, knitted or felted natural fibers (e.g., cotton), and bands of woven or knitted artificial fibers.

The outer layer 71 may also or alternatively comprise a stitchbond fabric. As is known in the textile arts, stitchbond fabric is created by mechanically bonding nonwoven material with stitches. Stitchbond fabric is also known as "stitch bond," "stich-bond," "stitchbonded," "stitch bonded," and "stitch-bonded" fabric. Although stitchbond fabric is created through a process that may be called stitchbonding (or "stitch bonding," etc.), a stitchbond fabric has a particular type of fabric structure that is distinct from fabric structures formed by other processes. In particular, a stitchbond fabric is a hybrid material in which a nonwoven fiber substrate material is reinforced and structurally defined by knitting stitches that penetrate that substrate. In some types of stitchbond fabric, the substrate may be a mat or web of nonwoven fibers, and the stitching may be separate yarns that penetrate that substrate, with those yarns knitted to create a pattern of nonwoven regions separated by stitching yarns. In other types of stitchbond fabric, the stitching may be created by fibers taken from the nonwoven mat. A stitchbond fabric used as (or as part of) the outer layer 71 may have a basis weight of at least 85 grams per square meter (GSM), a stitch count of at least 6 stitches per inch, and a tensile strength (per ASTM D5034) of at least 25 psi. A stitchbond fabric used as (or as part of) the outer layer 71 may comprise polyester fibers for the nonwoven mat and/or stitching yarns. Also or alternatively, a stitchbond fabric used as (or as part of) the outer layer 71 may comprise mat and/or stitching fibers formed from polypropylene (PP), polyethylene (PE), biaxially oriented polypropylene (BOPP), and/or other materials. The stitchbond fabric may also or alternatively be calendered and/or comprise one or more of a calendering agent, an adhesive primer agent, a static reduction agent, and/or a sizing agent.

The reinforcement layer 72 may be fixed relative to outer layer 71. The reinforcement layer 72 may comprise reinforcement fibers 77 bonded to a side of the sheet 76 by a laminating adhesive 78 (e.g., an ethylene vinyl acetate water based copolymer adhesive). The fibers 77 may be parallel to one another and may extend continuously over the facing material 24. The fibers 77 may, for example, comprise bundles of polymer strands having a denier (a linear mass density in grams per 9000 meters) of between about 1400 and about 1650. A density of the fibers 77, in a direction perpendicular to the fibers (labeled "X" in FIG. 6A), may be between 5 and 25 fibers 77 per inch. Strands of fibers 77 may comprise polyester, glass, polypropylene, carbon, and/or other materials.

Figure 6B:
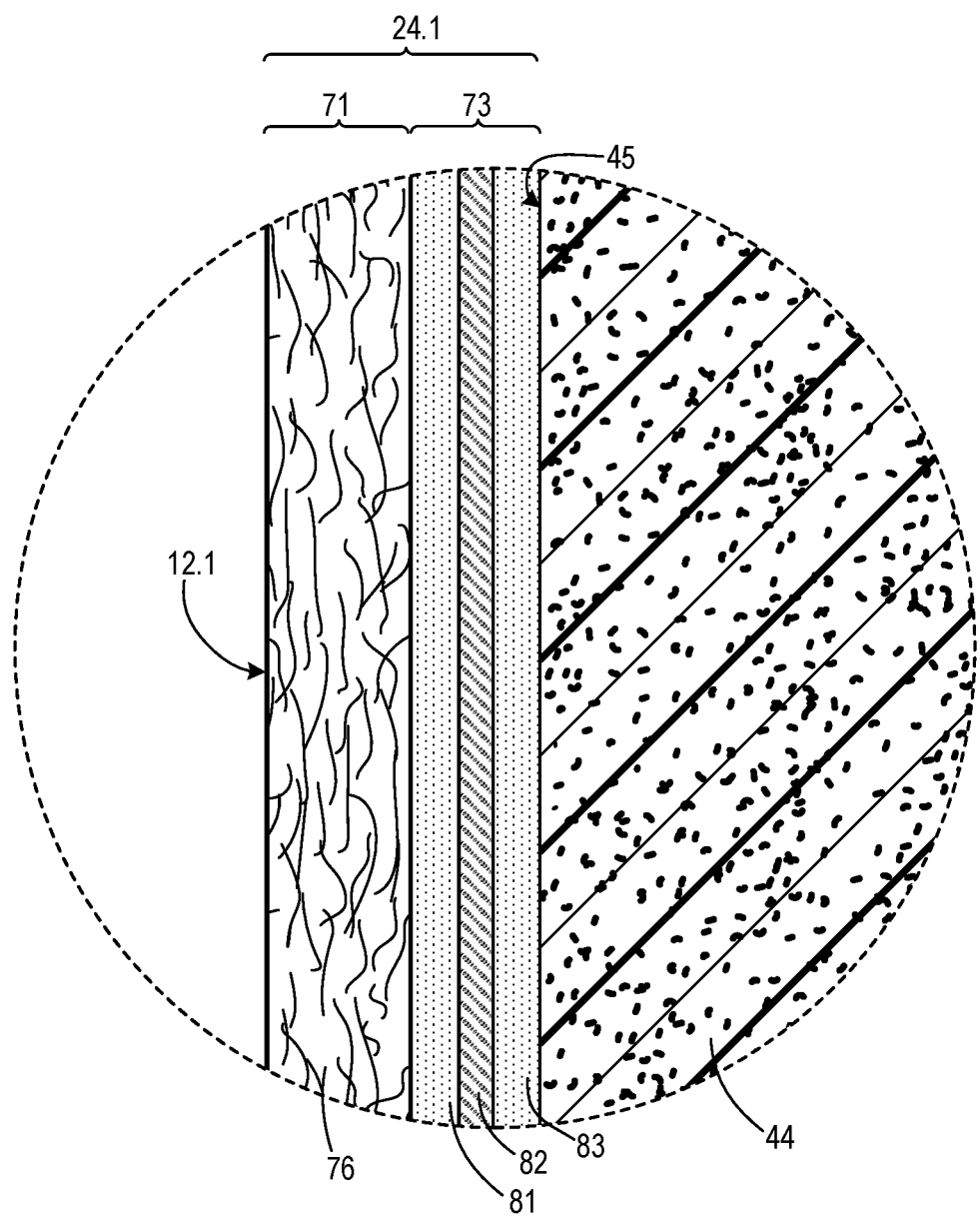
FIG. 6B is an area cross-sectional view, similar to that of FIG. 6A, showing another example of a facing material.

A separate reinforcement layer 72 may be omitted. For example, the outer layer 71 may be bonded (e.g., via the attachment layer 73) directly to the core 44 and/or to portions of the side caps 20. An example of this construction is shown in FIG. 6B, an enlarged area cross-sectional view, similar to that of FIG. 6A, and corresponding to a similar portion of a modified version the cargo restraint panel 10 comprising a modified facing material 24.1. The surface 12.1 of that modified version of the cargo restraint panel 10 is similar to the surface 12 of the panel 10.

In the example of FIG. 6B, the attachment layer 73 may fixed relative to the outer layer 71 and relative to the core 44. In the example of FIG. 6A, the attachment layer 73 may fixed relative to the reinforcement layer 72 and relative to the core 44. The attachment layer 73 may, for example, comprise a first adhesive layer 81, a second adhesive layer 83 and a substrate layer 82. The substrate layer 82 may at least partially separate the adhesive layers 81 and 82. However, the substrate layer 82 may comprise holes or other perforations permitting direct contact between the adhesive layers 81 and 83 in certain regions. The substrate layer 82 may be omitted. The adhesive layers 81 and 83 may, for example, comprise an acrylic adhesive and the substrate layer 82 may comprise a film of polyethylene terephthalate (PET) or other polymer. Also or alternatively, the attachment layer 73 may comprise an adhesive similar to that used for laminating adhesive 78.

The facing material 24 may be replaced or supplemented with a facing material comprising a monolithic polymer sheet. The monolithic polymer sheet may, for example, comprise a sheet of PET. That PET sheet may be bonded to the core 44 and/or to portions of the side caps 20 by a layer of an ethylene vinyl acetate water based copolymer adhesive, an acrylic adhesive, and/or some other type of adhesive.

Figure 7:
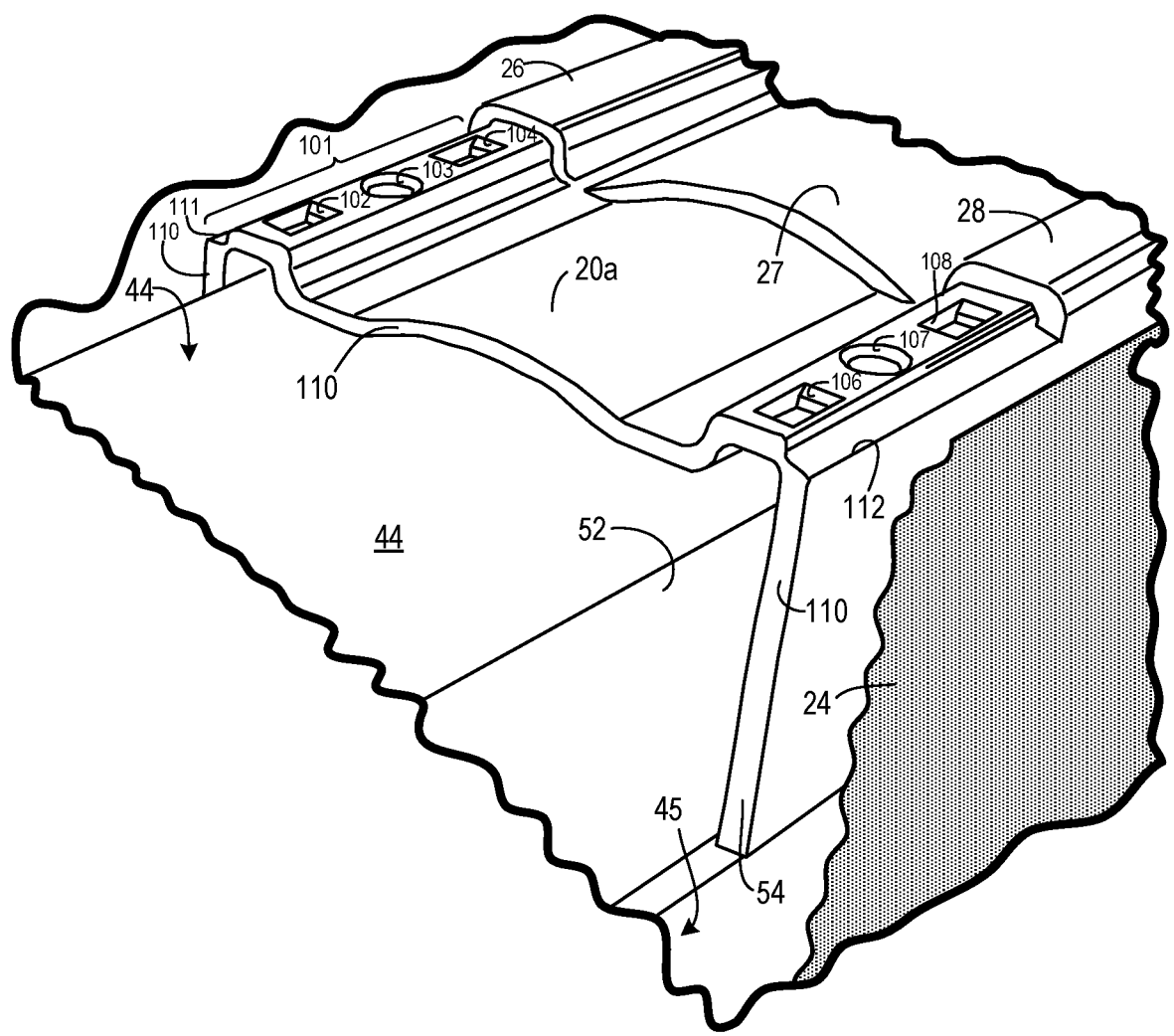
FIG. 7 is a perspective view of a portion of the cargo restraint panel of FIG. 2A.

FIG. 7 is a perspective view of a portion of the panel 10 showing additional details of a main section 20a of the side cap 20 on the top side 14 of the cargo restraint panel 10. The adjacent main section 20a and the connecting section 20b connected to the main section 20a shown in FIG. 7 have been omitted, as has been a portion of the facing material 24. Each of the main sections 20a may comprise two opposite ends 101 that are of reduced thickness, relative to other portions of the main section 20a, so as to form first mating areas on an upper surface of the main section 20a. Holes 102, 103, 104, 106, 107, and 108 may be formed in portions of the end 101 corresponding to the ridges 26 and 27. When installed on the core 44, the end face 110 of the end 101 may abut an end face 110 of an adjacent main section 20a or a face of an end section 20c (described below).

Each of the connecting sections 20b may comprise an underside configured to fit into the portion of the end 101 between edges 111 and 112, as well as into a similar portion of an adjacent end 101 of an adjacent main section 20a. Connecting sections 20b may be configured so that interfaces between a main section 20a and a connecting section 20b on the outer surface of a side cap 20 are flush. The underside of the ends of a connecting section 20b may comprise projections positioned to rest within the holes 102, 103, 104, 106, 107, and 108 of adjacent ends 101. One or more of those projections may comprise projections that biased to expand after passing through one of those holes and to thereby secure the connecting section 20b to a main section 20a.

Figure 8:
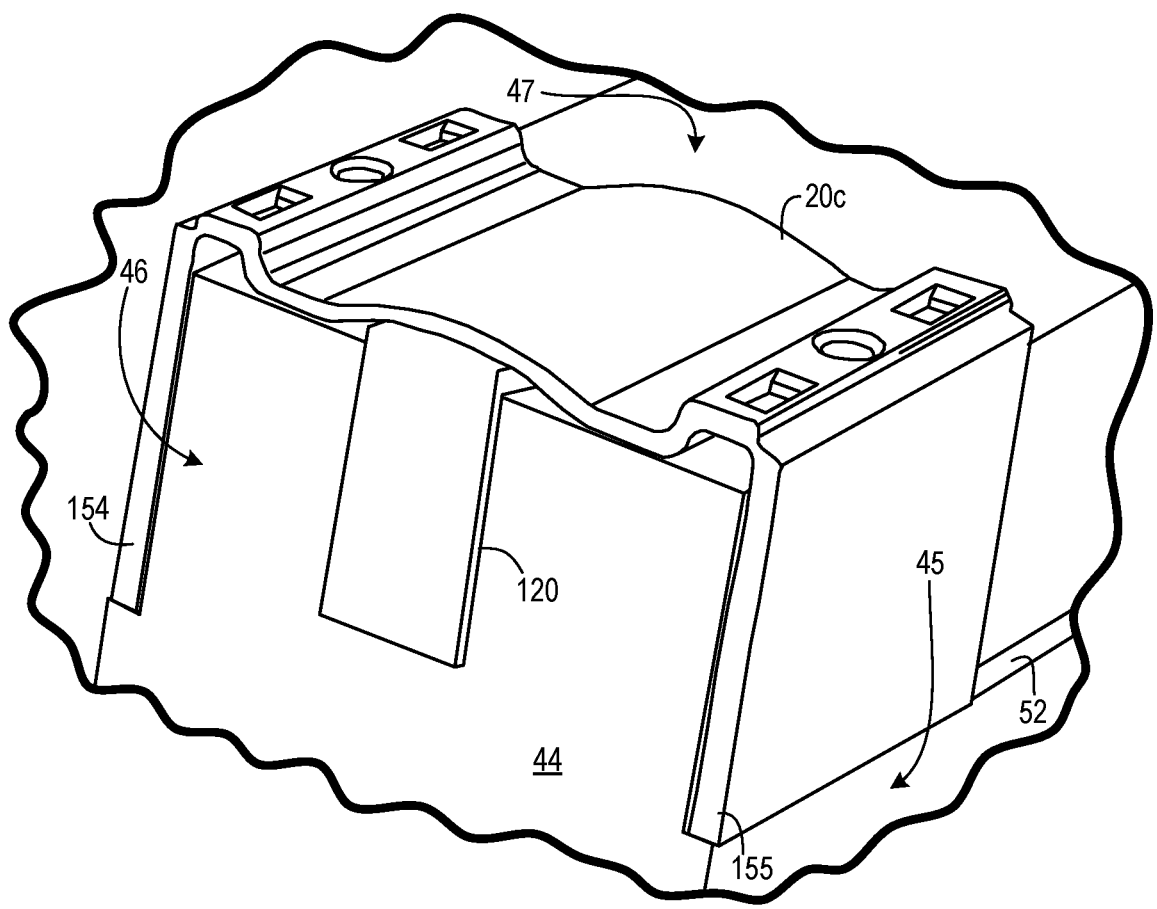
FIG. 8 is a perspective view of another portion of the cargo restraint panel of FIG. 2A.

Optionally, a side cap 20 may comprise an end section 20c configured to form an end-most portion of the side cap 20 that is secured via a bracket 120 to a core side (e.g., the core side 46 or the core side 48) that is adjacent to the core side covered by the side cap. FIG. 8 is a perspective view of a portion of the cargo restraint panel 10 showing additional details of an end section 20c of the side cap 20 on the top side 14 of the cargo restraint panel 10. The adjacent main section 20a and the connecting section 20b connected to the end section 20c have been omitted, as has the facing material 24 and the side cap 22 covering the core side 46. A similar end section 20c may be positioned at the other end of the side cap 20 covering the core side 14. The end sections 20c may be similar to the ends 101 of the main sections 20a. Each of the end sections 20c may have a face, not visible in FIG. 8, that abuts a face 110 of an end 101 of an adjacent main section 20a. The end sections 20c may comprise holes and an upper surface, similar to the holes and upper surface of an end 101, configured to mate with a connecting section 20b. Flanges 154 and 155 of the end sections 20c may be similar to the flanges 54 and 55 of the main sections 20a. The end sections 20c may further comprise an angle bracket 120 that rests on a portion of the corner formed by adjacent core sides (core sides 46 and 47 in the example of FIG. 8).

The cargo restraint panel 10 may be assembled by installing the side caps 20 on the core sides 47 and 49. To install the side caps 20, the main sections 20a and the end sections 20c may be first attached to the core 40, followed by attachment of connecting sections 20b. Optionally, adhesive may be applied to the rabbets 52 to bond to inner surfaces of the flanges 54 and 55 of the main sections 20a and to the inner surfaces of the flanges 154 and 155 of the end sections 20c. After installation of the side caps 20, a front sheet of the facing material 24 may be bonded to the core front 45 and to portions of the side caps 20 in the rabbets 52 on the core front 45. A rear sheet of the facing material 24 may be bonded to the core rear 50 and to portions of the side caps 20 in the rabbets 52 on the core rear 50. After bonding of the sheets of the facing material 24, the side caps 22 may be installed over the core sides 46 and 48. Each of the side caps 22 may slide over the end caps 20c, of the side caps 20, that are adjacent to the panel side being covered by the side cap 22.

Figure 9:
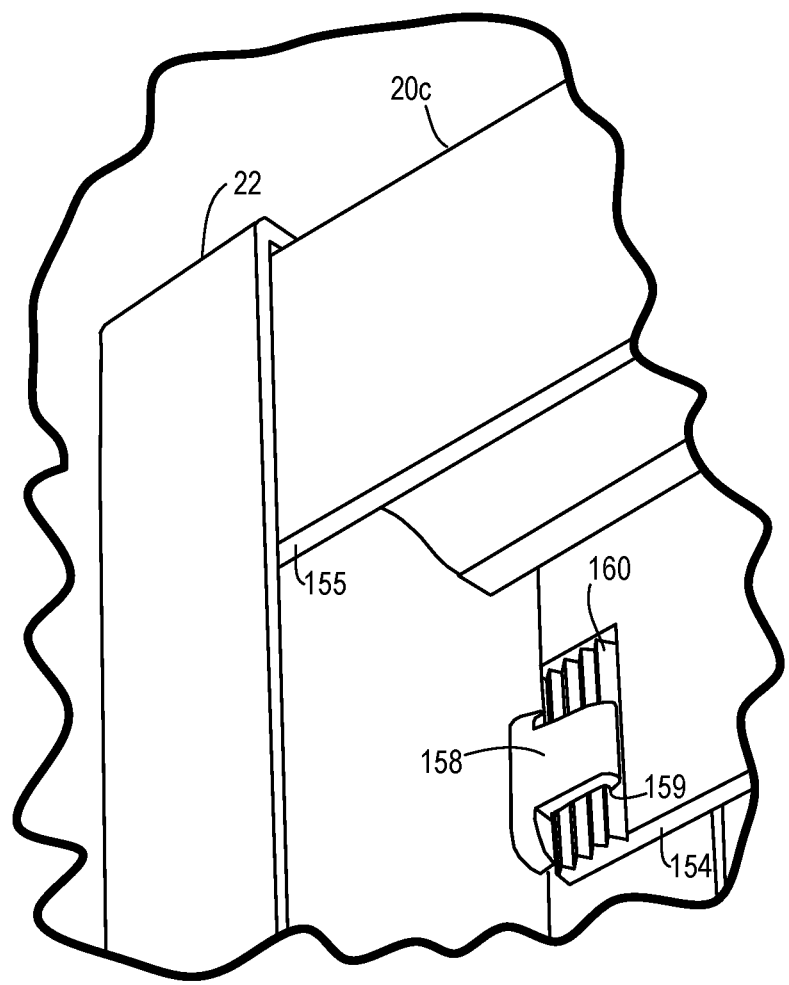
FIG. 9 is a perspective view of a further portion of the cargo restraint panel of FIG. 2A.

To secure the side caps 22 in place, the side caps 22 may comprise one or more flexible retaining arms that engage a feature of an end cap 20c. FIG. 9 is a perspective view of an interior portion of the cargo restraint panel 10 and that shows an example of an engaged retaining arm. In FIG. 9, the core 44 and the facing material 24 are omitted. For convenience, the gripping panel 62 and certain of features of the interior surface of the side cap 22 are also omitted. A flexible arm 158 may be attached to the interior surface of the side cap 22 and may be biased outward (e.g., in a direction toward the flange 154). The arm 158 may comprise a hooked end 159. An interior surface of the flange 154 of the end section 20c may comprise a set of grooves 160. When the side cap 22 is installed, the hooked end 159 may engage one of the grooves 160 and secure the side cap 22 to the end section 20c. The interior surface of the flange 155 may also comprise grooves 160, and a second arm 158 (not visible in FIG. 8) attached to the side cap 22 may engage one of those grooves 160. The other end of the side cap 22 may comprise additional arms 158 that engage grooves 160 of another end section 20c.

Figure 10A:
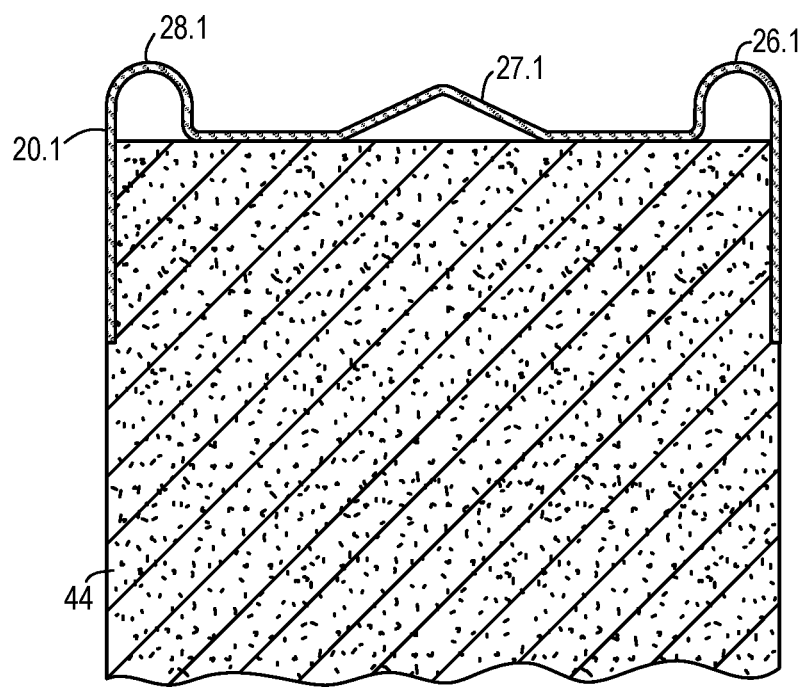
FIGS. 10A and 10B are area cross-sectional views, from locations similar to the location indicated in FIG. 2A for the area cross-sectional view of FIG. 3, showing additional examples of cargo restraint panel side caps.
Figure 10B:
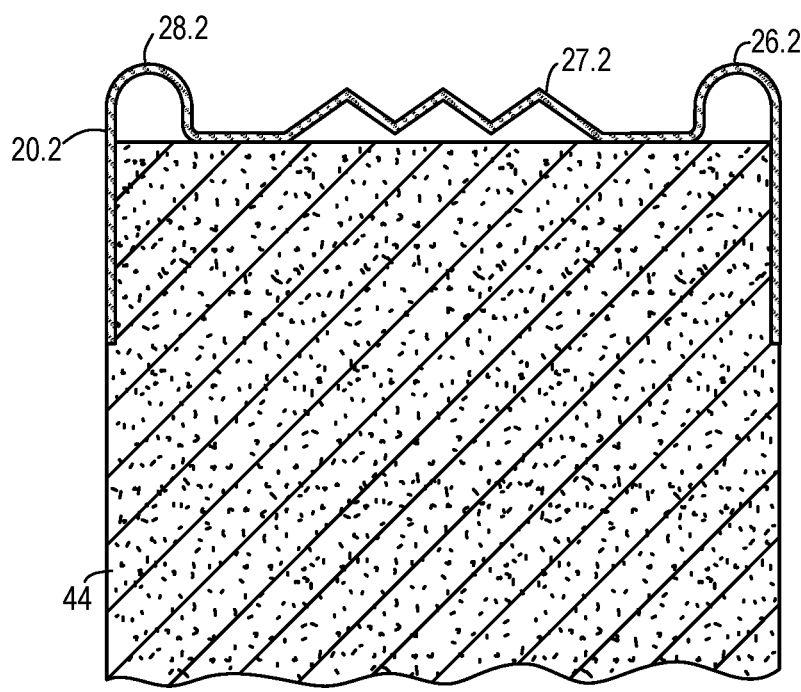

The structure of various features described herein may be modified. Such modified structures may retain functionality described herein, but may have a different visual appearance. For example, and as shown in FIGS. 10A and 10B, the shapes and/or quantity of ridges may be varied. FIG. 10A is an area cross-sectional view, from a location similar to the location indicated in FIG. 2A for the area cross-sectional view of FIG. 3, showing another example of a cargo restraint panel side cap. As shown in FIG. 10A, a side cap 20.1 may comprise a rounded front ridge 28.1 and a rounded rear ridge 26.1. In the cross-section of FIG. 10A, a shape of a compression ridge 27.1 of the side cap 20.1 comprises an open-sided polygon. In the example of FIG. 10A, the open-sided polygon is an open-sided triangle. FIG. 10B is another area cross-sectional view, from a location similar to the location indicated in FIG. 2A for the area cross-sectional view of FIG. 3, showing a further example of a cargo restraint panel side cap. The side cap 20.2 of FIG. 10B may comprise a rounded front ridge 28.2, a rounded rear ridge 26.2, and a compression ridge 27.2 having a cross-sectional shape comprising a different open-sided polygon.

Side caps such as those described herein may completely cover a side of a foam core such as the core 44. Alternatively, one or more side caps may comprise one or more openings. For example, openings may comprise openings such as handle openings 32-34 configured to receive a handle. Also or alternatively, openings may be provided for other purposes. For example, one or more openings may be formed in a side cap to allow ventilation. A side cap may comprise one or more openings but may still substantially cover a core side (e.g., by covering at least 80% of a core side, at least 90% of a core side, etc.).

A cargo restraint panel may comprise combinations of side cap types other than the combinations shown in the drawings. For example, a single side of a cargo restraint panel may comprise a side cap with a compression ridge, and remaining sides of that cargo restraint panel may comprise side caps without compression ridges (and/or without any ridges). A cargo restraint panel may comprise, on a first side, a first type of side cap (e.g., the side cap 20) comprising a compression ridge and may comprise, on a second side, a second type of side cap (e.g., the side cap 20.1 or the side cap 20.2) comprising a compression ridge.

A cargo restraint panel may comprise one or more side caps and/or one or more other features described herein and may further comprise a polymer coating to provide further wear protection, chemical protection, and/or other type of protection. Such polymers may comprise urethane and epoxy resins and concrete elastomeric materials, and may be applied by spraying or by other processes. Such coatings may be applied before or after application of a facing material barrier and/or side caps. Such coatings may be applied instead of a facing material barrier.

Although examples of cargo restraint panels described above and shown in the drawings are rectangular and comprise a substantially planar and parallel front and rear, this is not required. A cargo restraint panel may comprise one or more side caps and/or one or more other features described herein, but may have a non-rectangular shape. For example, such cargo restraint panels may have less than four sides or more than four sides. Such cargo restraint panels may be all or partially circular, may be all or partially elliptical, or otherwise have an at least partially curved shape. Fronts and rear need not be planar and may be curved, may be faceted, and/or may have other configurations. A front and a rear of a cargo restraint panel need not be parallel.

A method may comprise securing cargo using one or more cargo restraint panels such as are described herein. Such a method may comprise placing a plurality of cargo units in a railcar and placing a plurality cargo restraint panels in the railcar. The cargo units and the cargo restraint panels may be arranged, in a front to rear direction of the railcar, in alternating groups of one or more cargo units separated by one or more cargo restraint panels. Some or all of the cargo restraint panels may comprise a cargo restraint panel such as is described herein. All of the cargo units may secured in the front to rear direction by one of another of the cargo units or one of the cargo restraint panels.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. A cargo restraint panel comprising:
 a panel front, a panel rear, and one or more panel sides located between the panel front and the panel rear;
 a polymer foam core comprising a core front corresponding to the panel front, a core rear corresponding to the panel rear, and one or more core sides respectively corresponding to the one or more panel sides;
 a flexible front barrier covering at least a portion of the core front;
 a flexible rear barrier covering at least a portion of the core rear; and
 a side cap positioned over a first core side, of the one or more core sides, and extending from the panel front to the panel rear, wherein the side cap extends along a length of a first panel side, of the one or more panel sides, corresponding to the first core side, and the side cap comprises:
a compression ridge extending along the length of the first panel side,
a rear valley extending along the length of the first panel side and located between the compression ridge and the panel rear, and
a front valley extending along the length of the first panel side and located between the compression ridge and the panel front.

2. The cargo restraint panel of claim 1, wherein the panel comprises an air gap between the first core side and an interior surface of the compression ridge.

3. The cargo restraint panel of claim 1, wherein a shape of the compression ridge, in a cross-section perpendicular to the length of the first panel side, comprises an open-sided dome or an open-sided polygon.

4. The cargo restraint panel of claim 1, wherein the side cap comprises:
a rear ridge, extending along the length of the first panel side, separated from the compression ridge by the rear valley, and
a front ridge, extending along the length of the first panel side, separated from the compression ridge by the front valley.

5. The cargo restraint panel of claim 4, wherein the compression ridge, the rear ridge, and the front ridge are configured so that the side cap is placeable into contact with a planar surface so as to rest on the rear ridge and the front ridge without resting on the compression ridge.

6. The cargo restraint panel of claim 1, further comprising one or more handles attached to the compression ridge.

7. The cargo restraint panel of claim 1, further comprising a second side cap positioned over a second core side, of the one or more core sides, and extending from the panel front to the panel rear, wherein
the second side cap extends along a length of a second panel side, of the one or more panel sides, corresponding to the second core side, and
the second side cap comprises:
a second compression ridge extending along the length of the second panel side,
a second rear valley extending along the length of the second panel side and located between the second compression ridge and the panel rear, and
a second front valley extending along the length of the second panel side and located between the second compression ridge and the panel front.

8. The cargo restraint panel of claim 1, wherein
the front barrier is bonded to a first portion of the core front and to a front portion of the side cap covering a second portion of the core front; and
the rear barrier is bonded to a first portion of the core rear and to a rear portion of the side cap covering a second portion of the core rear.

9. The cargo restraint panel of claim 1, wherein each of the front barrier and the rear barrier comprises a stitchbond fabric layer.

10. The cargo restraint panel of claim 1, wherein the side cap comprises a plurality of separate first sections, respectively extending along separate portions of the length of the first panel side, joined by connecting sections.

11. A cargo restraint panel comprising:
a panel front, a panel rear, and one or more panel sides located between the panel front and the panel rear;
a polymer foam core comprising a core front corresponding to the panel front, a core rear corresponding to the panel rear, and one or more core sides respectively corresponding to the one or more panel sides;
a flexible front barrier covering at least a portion of the core front;
a flexible rear barrier covering at least a portion of the core rear; and
a side cap positioned over a first core side, of the one or more core sides, and extending from the panel front to the panel rear, wherein
the side cap comprises a compression ridge extending along a length of a first panel side, of the one or more panel sides, corresponding to the first core side, and
the panel comprises an air gap between the first core side and an interior surface of the compression ridge.

12. The cargo restraint panel of claim 11, wherein a shape of the compression ridge, in a cross-section perpendicular to the length of the first panel side, comprises an open-sided dome or an open-sided polygon.

13. The cargo restraint panel of claim 11, wherein the side cap comprises:
a rear ridge, extending along the length of the first panel side, separated from the compression ridge by a rear valley, and
a front ridge, extending along the length of the first panel side, separated from the compression ridge by a front valley.

14. The cargo restraint panel of claim 11, wherein
the front barrier is bonded to a first portion of the core front and to a front portion of the side cap covering a second portion of the core front; and
the rear barrier is bonded to a first portion of the core rear and to a rear portion of the side cap covering a second portion of the core rear.

15. The cargo restraint panel of claim 11, wherein each of the front barrier and the rear barrier comprises a stitchbond fabric layer.

16. A cargo restraint panel comprising:
a panel front, a panel rear, and one or more panel sides located between the panel front and the panel rear;
a polymer foam core comprising a core front corresponding to the panel front, a core rear corresponding to the panel rear, and one or more core sides respectively corresponding to the one or more panel sides;
a side cap positioned over a first core side, of the one or more core sides, and extending from the panel front to the panel rear, wherein
the side cap extends along a length of a first panel side, of the one or more panel sides, corresponding to the first core side, and
the side cap comprises:
a compression ridge extending along the length of the first panel side, wherein an air gap separates the first core side and an interior surface of the compression ridge,
a rear ridge, extending along the length of the first panel side, separated from the compression ridge by a rear valley, and
a front ridge, extending along the length of the first panel side, separated from the compression ridge by a front valley.

17. The cargo restraint panel of claim 16, wherein a shape of the compression ridge, in a cross-section perpendicular to the length of the first panel side, comprises an open-sided dome or an open-sided polygon.

18. The cargo restraint panel of claim 16, wherein the compression ridge, the rear ridge, and the front ridge are configured so that the side cap is placeable into contact with a planar surface so as to rest on the rear ridge and the front ridge without resting on the compression ridge.

19. The cargo restraint panel of claim 16, further comprising one or more handles attached to the compression ridge.

20. The cargo restraint panel of claim 16, further comprising stitchbond fabric layers respectively covering at least portions of the core front and at least portions of the core rear.

* * * * *